United States Patent
Araki et al.

(10) Patent No.: US 11,187,166 B2
(45) Date of Patent: Nov. 30, 2021

(54) INTERNAL COMBUSTION ENGINE AND METHOD OF CONTROLLING SAME

(71) Applicant: NISSAN MOTOR CO., LTD., Yokohama (JP)

(72) Inventors: Takashi Araki, Kanagawa (JP); Takayuki Hamamoto, Kanagawa (JP); Yoshiyasu Kimura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/955,440

(22) PCT Filed: Dec. 22, 2017

(86) PCT No.: PCT/JP2017/046104
§ 371 (c)(1),
(2) Date: Jun. 18, 2020

(87) PCT Pub. No.: WO2019/123624
PCT Pub. Date: Jun. 29, 2019

(65) Prior Publication Data
US 2021/0071601 A1  Mar. 11, 2021

(51) Int. Cl.
*F02D 23/00* (2006.01)
*F02D 41/00* (2006.01)
(Continued)

(52) U.S. Cl.
CPC .......... *F02D 41/0007* (2013.01); *F02B 37/16* (2013.01); *F02B 37/183* (2013.01);
(Continued)

(58) Field of Classification Search
CPC ........ F02B 37/16; F02B 37/183; F02D 23/00; F02D 41/0007; F02D 41/3064; F02D 2041/001; F02D 2200/0406
See application file for complete search history.

(56) References Cited

U.S. PATENT DOCUMENTS

2010/0071658 A1\*  3/2010  Soejima ................. F02B 37/16
                                                    123/406.19
2016/0047339 A1   2/2016  Kuze
(Continued)

FOREIGN PATENT DOCUMENTS

JP   2008-121511 A    5/2008
JP   2014-190264 A   10/2014
(Continued)

*Primary Examiner* — Audrey B. Walter
(74) *Attorney, Agent, or Firm* — Faegre Drinker Biddle & Reath LLP

(57) ABSTRACT

An internal combustion engine (1) is provided with a turbocharger (2), and is configured to be switchable between a stoichiometric combustion mode having a theoretical air-fuel ratio as a target air-fuel ratio and a lean combustion mode having a lean air-fuel ratio as a target air-fuel ratio. An air bypass valve (20) is provided in an air bypass passage (19) communicating a collector (11*a*) on the downstream of a throttle valve (12) with the upstream side of a compressor (2*b*) in an intake passage (11). At the time of the shifting from the lean combustion mode to the stoichiometric mode, the throttle valve (12) is closed and the air bypass valve (20) is temporarily opened to decrease the pressure inside the collector (11*a*) quickly.

5 Claims, 3 Drawing Sheets

(51) Int. Cl.
*F02D 41/30* (2006.01)
*F02B 37/16* (2006.01)
*F02B 37/18* (2006.01)

(52) U.S. Cl.
CPC .......... *F02D 23/00* (2013.01); *F02D 41/3064* (2013.01); *F02D 2041/001* (2013.01); *F02D 2200/0406* (2013.01)

(56) References Cited

U.S. PATENT DOCUMENTS

| | | |
|---|---|---|
| 2016/0047350 A1 | 2/2016 | Kuze |
| 2016/0053695 A1 | 2/2016 | Kuze |
| 2016/0061126 A1 | 3/2016 | Kuze |
| 2017/0074204 A1* | 3/2017 | Takamiya ........... F02D 13/0242 |
| 2019/0032585 A1* | 1/2019 | Kelly ..................... F02B 39/10 |

FOREIGN PATENT DOCUMENTS

| | | |
|---|---|---|
| JP | 2014-190264 A | 10/2014 |
| JP | 2014-190339 A | 10/2014 |
| JP | 2016-006305 A | 1/2016 |
| WO | WO-2014/156208 A1 | 10/2014 |

\* cited by examiner

INTERNAL COMBUSTION ENGINE AND METHOD OF CONTROLLING SAME

TECHNICAL FIELD

The present invention relates to an internal combustion engine configured to be switchable between a stoichiometric combustion mode having a theoretical air-fuel ratio as a target air-fuel ratio and a lean combustion mode having a lean air-fuel ratio as a target air-fuel ratio and a method for controlling the same, and particularly to an internal combustion engine equipped with a turbocharger for securing an intake air amount in the lean combustion mode and a method for controlling the same.

BACKGROUND TECHNOLOGY

An internal combustion engine has been known which is configured to be switchable between a stoichiometric combustion mode having a theoretical air-fuel ratio as a target air-fuel ratio and a lean combustion mode having a lean air-fuel ratio as a target air-fuel ratio, in order to reduce fuel consumption. In a patent document 1, an internal combustion engine is disclosed which has a supercharging lean combustion mode having a target air-fuel ratio as a lean air-fuel ratio with performing of supercharging by using a turbocharger and a non-supercharging stoichiometric combustion mode having a target air-fuel ratio as a theoretical air-fuel ratio without supercharging. In such an internal combustion engine, it is necessary to reduce an intake air amount to be sucked into a cylinder, when the supercharging lean combustion mode is switched to the non-supercharging stoichiometric combustion mode. Therefore, in the patent document 1, an air bypass valve which is capable of communicating between the downstream side of a compressor of the turbocharger and the upstream side of the compressor is opened at the time when the supercharging lean combustion mode is switched to the non-supercharging stoichiometric combustion mode, to return excess compressed air to the upstream side of the compressor.

However, in the patent document 1, a throttle valve is located on the downstream side of the compressor of the turbocharger, and compressed air is released between the compressor and the throttle valve through the air bypass valve. Consequently, when the throttle valve is closed to reduce an intake air amount at the time when the combustion mode is shifted from the supercharging lean combustion mode to the non-supercharging stoichiometric combustion mode, the region on the downstream side from the throttle valve substantially becomes a closed space, and the pressure thereinside cannot be released through the air bypass valve. Therefore, the response to a reduction in intake air amount at the time when the combustion mode is shifted from the supercharging lean combustion mode to the non-supercharging stoichiometric combustion mode is low, as a result of which, for example, temporary torque variation occurs.

An object of the present invention is to quickly reduce the pressure inside a collector on the upstream of an intake valve at the time when a lean combustion mode is shifted to a stoichiometric combustion mode such that excessive intake air is not taken into a cylinder.

PRIOR ART DOCUMENT

Patent Document

Patent Document 1: Japanese Patent Application Publication 2008-121511

SUMMARY OF THE INVENTION

In an internal combustion engine of the present invention which includes a turbocharger and a throttle valve on the downstream side of a compressor of the turbocharger, and which is configured to be switchable between a stoichiometric combustion mode having a theoretical air-fuel ratio as a target air-fuel ratio and a lean combustion mode having a lean air-fuel ratio as a target air-fuel ratio, the opening degree of the throttle valve is reduced when the lean combustion mode is shifted to the stoichiometric combustion mode, and an air bypass valve communicating with a position more on a downstream side than the throttle valve is temporarily opened to bypass intake air inside a collector to the upstream side of the compressor.

In this way, by releasing supercharged intake air from the downstream side of the throttle valve through the air bypass valve, the pressure inside the collector is quickly reduced. Consequently, the response to a reduction in intake air amount at the time of the shifting from the lean combustion mode to the stoichiometric combustion mode becomes high, and, for example, torque variation is suppressed.

MODE FOR IMPLEMENTING THE INVENTION

In the following, one embodiment of the present invention will be explained based on the drawings.

Figure 1:
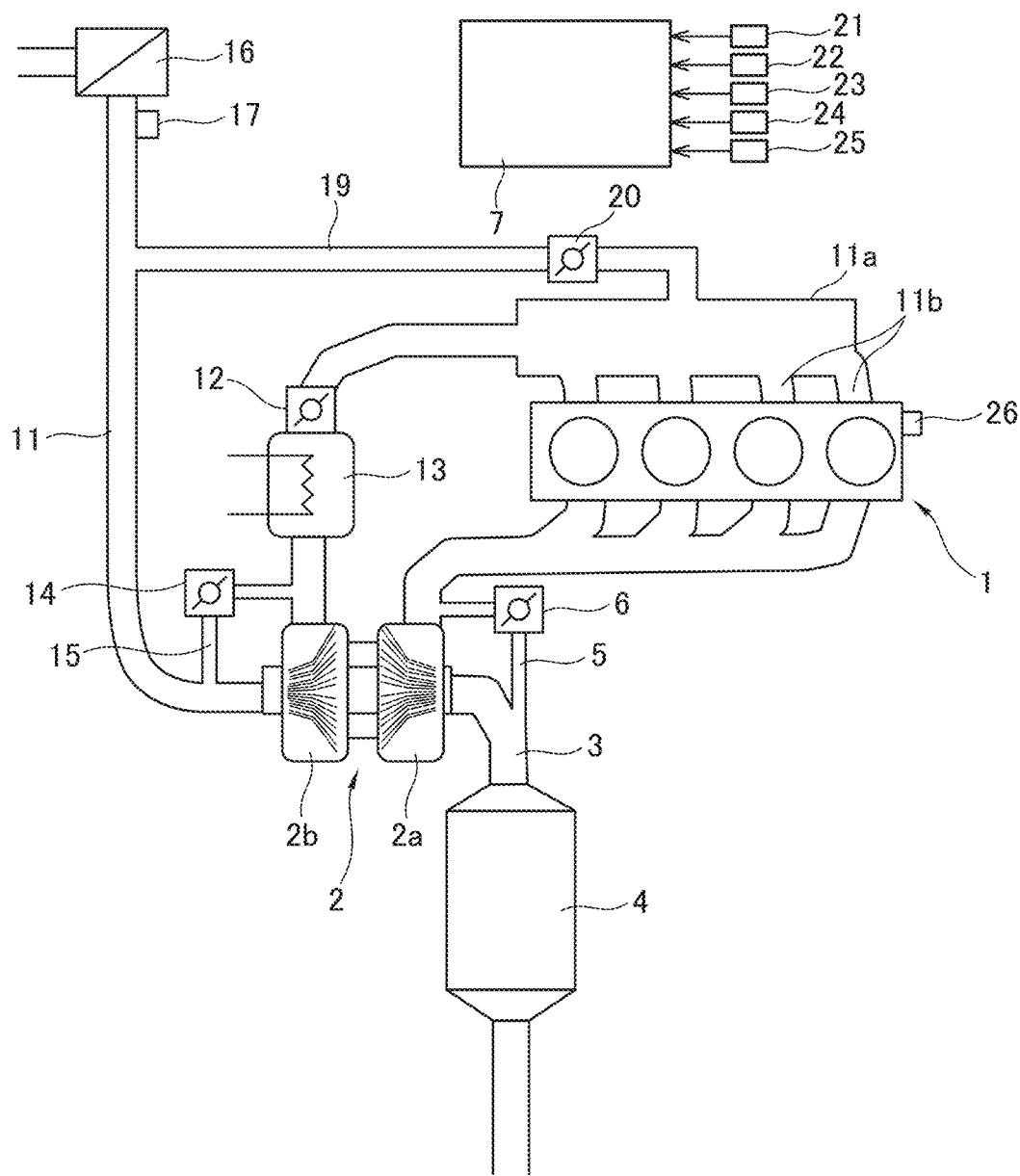
FIG. 1 is a schematic illustrative view showing a system configuration of an internal combustion engine becoming one embodiment of the present invention.

FIG. 1 shows a system configuration of an internal combustion engine 1 becoming one embodiment of the present invention. In this embodiment, a turbocharger 2 serving as a supercharging means is equipped. Internal combustion engine 1 is, for example, a four stroke cycle spark ignition type gasoline engine, and is particularly configured to be switchable between a stoichiometric combustion mode having a theoretical air-fuel ratio (that is, excess air ratio $\lambda=1$) as a target air-fuel ratio and a lean combustion mode having a lean air-fuel ratio (for example, $\lambda$=near 2) as a target air-fuel ratio. In the lean combustion mode, as compared with the stoichiometric combustion mode, a large amount of air is required, and the target air-fuel ratio is set on the premise of supercharging by turbocharger 2.

An exhaust turbine 2a of turbocharger 2 is disposed on an exhaust passage 3 of internal combustion engine 1, and a catalytic converter 4 using, for example, a three-way catalyst is disposed on the downstream side of exhaust turbine 2a. An exhaust silencer which is not shown in the drawing is provided on the further downstream side of exhaust passage 3, and exhaust passage 3 is opened to the outside through the exhaust silencer. Turbocharger 2 is equipped with a bypass passage 5 communicating the outlet side with the inlet side of exhaust turbine 2a for controlling supercharging pressure, and with a waste gate valve 6 provided to open and close bypass passage 5. This waste gate valve 6 is equipped with an electric actuator which is not shown in the drawing and is formed of an electric motor and the like, and the opening degree of waste gate valve 6 is controlled by the electric actuator based on a control signal from an engine controller 7.

A compressor 2b of turbocharger 2 is disposed on an intake passage 11 of internal combustion engine 1, and an electronic control type throttle valve 12 for controlling an intake air amount is disposed on the downstream side of compressor 2b. Throttle valve 12 is positioned on the inlet side of a collector 11a having a relatively large volume. Intake passage 11 is branched for each cylinder as branch portions lib, on the downstream side of collector 11a. Throttle valve 12 is equipped with an electric actuator, and the opening degree of throttle valve 12 is controlled by engine controller 7 based on the after-mentioned accelerator pedal opening degree.

An intercooler 13 for cooling supercharged intake air is provided between compressor 2b and throttle valve 12. This intercooler 13 has, for example, a water cooling type configuration in which cooling water is circulated.

In addition, a recirculation passage 15 equipped with a recirculation valve 14 is provided so as to communicate the outlet side with the inlet side of compressor 2b. Recirculation valve 14 is opened and closed based on a control signal from engine controller 7, and is basically controlled to an opening state at the time of deceleration of internal combustion engine 1, that is, at the time when throttle valve 12 is quickly closed. Consequently, pressurized intake air is circulated to compressor 2b through recirculation passage 15.

An air cleaner 16 is disposed on the upstream part of intake passage 11, and an air flow meter 17 for detecting an intake air amount is disposed on the downstream side of this air cleaner 16.

In addition, an air bypass passage 19 extending from the position on the downstream side of throttle valve 12 of intake passage 11 to the upstream side of compressor 2b is provided, and an air bypass valve 20 for opening and closing this air bypass passage 19 is provided. In the drawing, one end of air bypass passage 19 is connected to collector 11a and the other end thereof is connected to the position between the downstream of air flow meter 17 and the upstream of compressor 2b. In addition, air bypass valve 20 is disposed at a position relatively close to collector 11a in air bypass passage 19 such that the substantial volume of collector 11a does not unnecessary become large. Air bypass valve 20 is also opened and closed by a control signal from engine controller 7.

Internal combustion engine 1 is integrally controlled by engine controller 7. In addition to air flow meter 17, detection signals of various sensors, such as a crank angle sensor 21 for detecting an engine rotation speed, an accelerator opening sensor 22 for detecting the depression amount of an accelerator pedal (accelerator pedal opening degree) operated by a driver as a sensor for detecting torque request by the driver, a supercharging pressure sensor 23 for detecting a supercharging pressure (intake pressure) in collector 11a, an air-fuel ratio sensor 24 for detecting an exhaust gas air-fuel ratio and a water temperature sensor 25 for detecting the temperature of cooling water, are input to engine controller 7. Based on these detection signals, engine controller 7 optimally controls a fuel injection amount, a fuel injection timing and an ignition timing of internal combustion engine 1, the opening degree of throttle valve 12, the opening degree of waste gate valve 6, the opening degree of recirculation valve 14 and the opening degree of air bypass valve 20.

Moreover, in this embodiment, a variable valve timing mechanism 26 for changing the valve timing (opening timing and closing timing) of an intake valve is provided, and engine controller 7 optimally controls the advance amount of the opening-closing timing of the intake valve through this variable valve timing mechanism 26.

Figure 2:
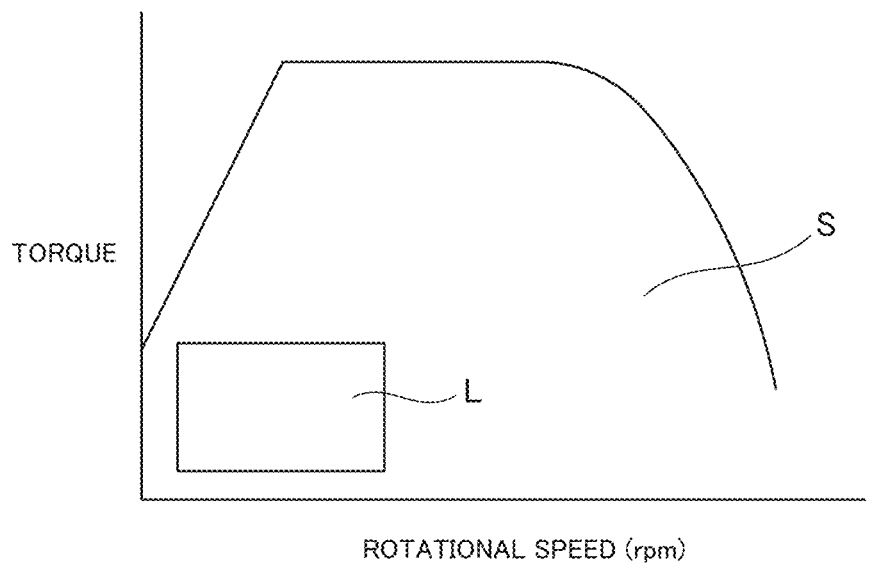
FIG. 2 is an illustrative view of a control map in which a stoichiometric combustion operating region and a lean combustion operating region are set.

FIG. 2 shows a control map in which a stoichiometric combustion operating region S as a stoichiometric combustion mode and a lean combustion operating region L as a lean combustion mode are set with the torque (in other words, a load) and the rotation speed of internal combustion engine 1 as parameters. This control map is previously stored in a storage device of engine controller 7 together with the after-mentioned target air-fuel ratio map. Lean combustion operating region L is set to a low-medium speed region in which the torque is relatively small. The region except lean combustion operating region L is basically stoichiometric combustion operating region S. In addition, although details are not shown in the drawing, in a region close to the full opening in stoichiometric combustion operating region S, the target air-fuel ratio is slightly richer than the theoretical air-fuel ratio. Here, lean combustion operating region L is basically a supercharging region. That is, the supply of air required for realizing the lean air-fuel ratio that is a target air-fuel ratio is carried out by the supercharging of turbocharger 2.

If the operation condition (torque and rotational speed) of internal combustion engine 1 is in stoichiometric combustion operating region S, a stoichiometric air-fuel ratio map is used as a target air-fuel ratio map, and the operation is performed in the stoichiometric combustion mode in which the fuel injection timing and the ignition timing are suitably set for stoichiometric combustion. The target air-fuel ratio map is a map in which a target air-fuel ratio is allocated to each operation point determined from the torque and the rotational speed. In the stoichiometric air-fuel ratio map to be used in the stoichiometric combustion mode, the theoretical air-fuel ratio or the target air-fuel ratio closed to it (an air-fuel ratio range in which a three-way catalyst action can be obtained) is allocated to each of the operation points. In addition, the target air-fuel ratio of each of the all operation points in the stoichiometric air-fuel ratio map may by, for example "14.7", or, in a part of the operation points, different values, such as "14.6" and "14.8", may be allocated.

On the other hand, if the operation condition of internal combustion engine 1 is in lean combustion operating region L, a lean air-fuel ratio map is used as a target air-fuel ratio map, and the operation is performed in the lean combustion mode in which the fuel injection timing and the ignition timing are suitably set for lean combustion. The lean air-fuel ratio map is one in which a target air-fuel ratio that is the lean air-fuel ratio is allocated to each operation point of lean combustion operating region L. Here, "lean air-fuel ratio" that becomes the target air-fuel ratio in the lean combustion mode is an air-fuel ratio on a lean side on which the exhaust amount of NOx is low to some extent, and, in one embodiment, for example, it becomes an air-fuel ratio in a range of 25-33 which is close to "λ=2". In addition, the value of this lean air-fuel ratio is only an example, and, in the present invention, the lean air-fuel ratio in the lean combustion mode may be in an air-fuel ratio range on the lean side which becomes the range discontinuous to an air-fuel range close to the theoretical air-fuel ratio in the stoichiometric air-fuel map (in other words, numerical ranges apart from each other). In the lean air-fuel ratio map, the value of the target air-fuel ratio at each of the operation points is generally not a certain value, and is set to a slightly different value in accordance with the torque and the rotational speed.

For example, if the lean air-fuel ratio that becomes the target air-fuel ratio in the lean combustion mode is equivalent to "λ=2", the air that is twice the air in a case of the theoretical air-fuel ratio is required. In the above internal combustion engine 1, in the lean combustion mode, an intake air (fresh air) amount to be required is secured by supercharging of turbocharger 2. Consequently, when the combustion mode is shifted from the lean combustion mode to the stoichiometric combustion mode, although the intake air amount to be required is reduced by half, the rotation of turbocharger 2 does not decrease quickly even if the opening degree of the throttle valve 12 is reduced, and then the response to the lowering of the intake air amount is delayed. Therefore, in the above embodiment, when the operation condition is shifted from lean combustion operating region L to stoichiometric combustion operating region S and the combustion mode is shifted from the lean combustion mode to the stoichiometric combustion mode, by temporarily opening air bypass valve 20, the intake air inside collector 11a which is in a supercharged state is bypassed to the upstream side of compressor 2b.

Figure 3:
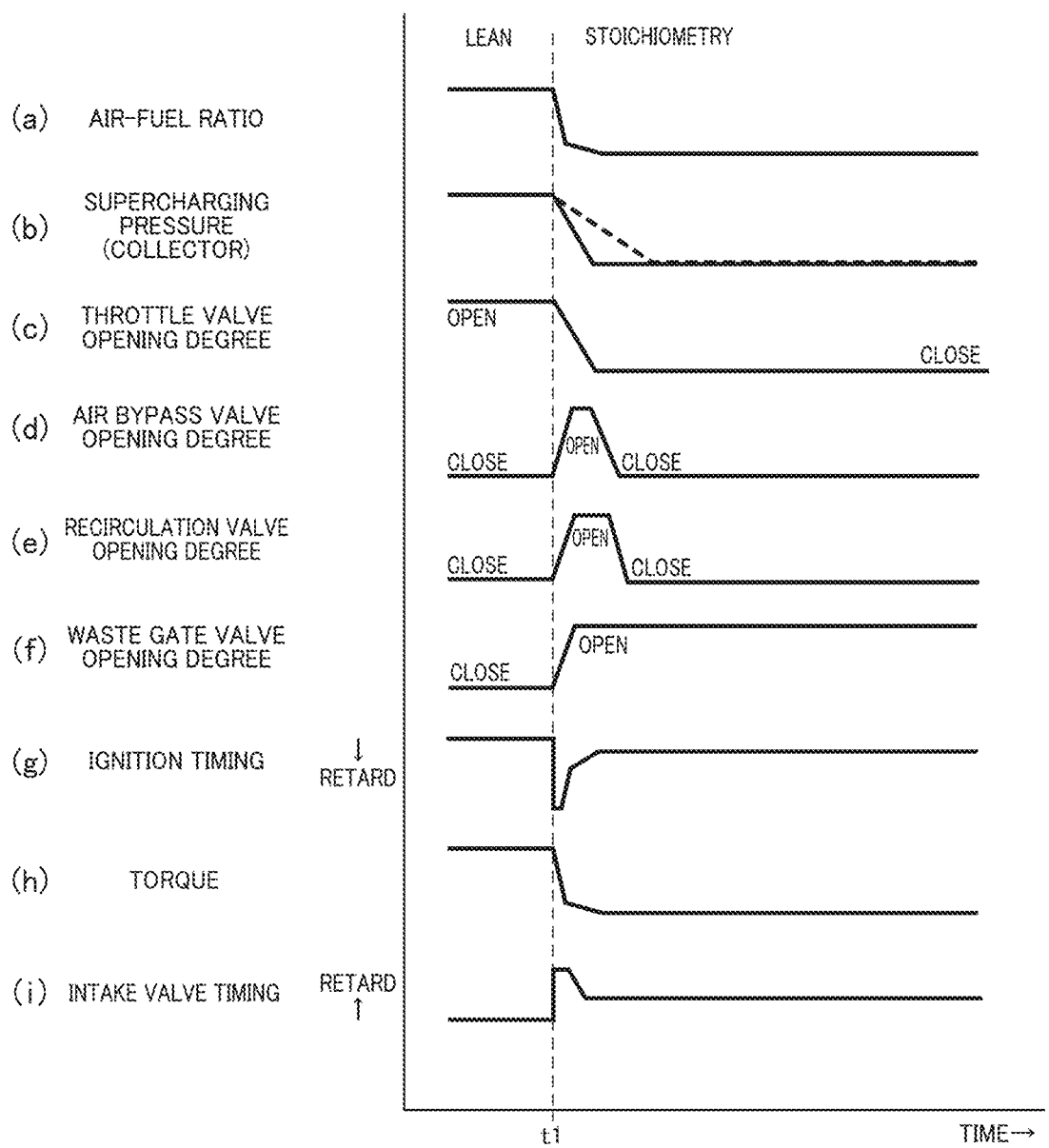
FIG. 3 is a time chart showing operation at the time of the shifting from a lean combustion mode to a stoichiometric combustion mode.

FIG. 3 is a time chart showing operation at the time of the shifting of the combustion mode in the above embodiment, and comparatively shows (a) exhaust gas air-fuel ratio, (b) supercharging pressure, (c) opening degree of throttle valve 12, (d) opening degree of air bypass valve 20, (e) opening degree of recirculation valve 14, (f) opening degree of waste gate valve 6, (g) ignition timing, (h) torque, and (i) control position of variable valve timing mechanism 26. In this example, the operation condition is in lean combustion operating region L and the operation is performed in the lean combustion mode until a time U. At time t1, the operation condition is shifted from lean combustion operating region L to stoichiometric combustion operating region S, and along with this, the shifting to the stoichiometric combustion mode is carried out.

The target air-fuel ratio is the lean air-fuel ratio equivalent to, for example, "λ=2" until time t1, and when the operation condition is shifted to stoichiometric combustion operating region S at time t1, the combustion mode is shifted to the stoichiometric combustion mode, and the target air-fuel ratio becomes a theoretical air-fuel ratio. Due to the decreasing of the intake air amount to be required with the change of this target air-fuel ratio, the opening degree of throttle valve 12 becomes small. However, since the rotation of turbocharger 2 does not decrease quickly, if any measures are not taken, as shown by the broken line in column (b), the supercharging pressure inside collector 11a slowly decreases. In contrast to this, in the above embodiment, as shown in column (d), air bypass valve 20 is temporarily opened, and the supercharging pressure inside collector 11a is released to the upstream side of compressor 2b. Consequently, the pressure inside collector 11a located more on the downstream side than throttle valve 12 and the pressure immediately before the intake valve rapidly decrease as shown in the solid line of column (b).

In addition, as shown in column (e), by temporarily opening the opening degree of recirculation valve 14, the outlet side and the inlet side of compressor 2b communicate with each other, and consequently, the intake pressure on the downstream side of throttle valve 12 decreases. Moreover, as shown in column (f), the opening degree of waste gate valve 6 is increased (for example, full opening), and consequently, the rotation speed of turbocharger 2 decreases. In addition, in a case where turbocharger 2 is a variable nozzle type turbocharger, the rotation of turbocharger 2 may be controlled by the control of the variable nozzle.

Each of air bypass valve 20 and recirculation valve 14 is returned to a closing state after a predetermined time (or after a predetermined cycle). Although the opening degree of waste gate valve 6 is returned to an opening degree in accordance with an operation condition (in other words, supercharging pressure requirement) after a predetermined time (or after a predetermined cycle), in this example, the operation point after the shifting at time t1 is a non-supercharging area, and waste gate valve 6 is kept in an opening state.

By such a control of air bypass valve 20, the response to the lowering of the intake air amount at the time of the shifting of the combustion mode becomes high, and, as shown in column (a), the exhaust gas air-fuel ratio can be stepwise changed from an exhaust gas air-fuel ratio equivalent to "λ=2" to an exhaust gas air-fuel ratio equivalent to a theoretical air-fuel ratio. Consequently, a transitional increase in NOx caused by an intermediate exhaust gas air-fuel ratio is suppressed.

In addition, in a case where internal combustion engine 1 is not equipped with recirculation valve 14, needless to say, the opening operation of recirculation valve 14 at the time of the shifting of the combustion mode is not carried out.

In addition, in an illustrated example, to suppress transitional torque increase (increase in actual torque when comparing with required torque) caused by the delay of the response to the lowering of the intake air amount, as shown in column (g), temporary retard control of the ignition timing is carried out at the time of the shifting of the combustion mode. Since, by such an ignition timing retard, the torque decreases, and the transitional torque increase is suppressed. The ignition timing retarded at time t1 is returned to an ignition timing in accordance with an operation condition after a predetermined time (or after a predetermined cycle). Moreover, by variable valve timing mechanism 26, the opening and closing timing of the intake valve is temporarily retarded. That is, the intake valve becomes in a so-called delayed closing state in which intake valve closing timing is relatively largely delayed from the lower dead center, and consequently, volumetric efficiency is lowered. Therefore, even if the supercharging pressure in collector 11a is the same, the intake air amount actually sucked into a cylinder becomes small. Variable valve timing mechanism 26 is returned to an advanced position in accordance with an operation condition after a predetermined time (or after a predetermined cycle). Therefore, the torque increase due to the delay of the lowering of the supercharging pressure at the time of the shifting of the mode can be suppressed. Here, an illustrated example shows an example in which the lean combustion mode is shifted to the stoichiometric combustion mode with the decreasing of the required torque (in other words, decreasing of the opening degree of an accelerator pedal), and therefore the torque shown in column (h) decreases corresponding to the required torque, after time t1.

In addition, the retard control of the ignition timing and the control of variable valve timing mechanism 26 can be omitted.

Moreover, as a variable valve mechanism, a variable valve lift mechanism which is capable of changing the lift amount of an intake valve may be equipped. In this case, when the lean combustion mode is shifted to the stoichiometric combustion mode, to lower volumetric efficiency, the lift amount is reduced. The variable valve mechanism may also be one in which both of the opening and closing timing and the lift amount of the intake valve are changed.

The invention claimed is:

1. A method for controlling an internal combustion engine, wherein the internal combustion engine includes a turbocharger and a throttle valve on a downstream side of a compressor of the turbocharger in an intake passage, and is configured to be switchable between a stoichiometric combustion mode having a theoretical air-fuel ratio as a target air-fuel ratio and a lean combustion mode having a lean air-fuel ratio as a target air-fuel ratio on a premise of supercharging, the method comprising:

reducing an opening degree of the throttle valve immediately in response to the lean combustion mode shifting to the stoichiometric combustion mode; and temporarily opening an air bypass valve communicating with a position more on a downstream side than the throttle valve to bypass intake air inside a collector to an upstream side of the compressor in the intake passage, wherein the air bypass valve is temporarily opened immediately in response to the lean combustion mode shifting to the stoichiometric combustion mode.

2. The method for controlling the internal combustion engine according to claim 1, further comprising temporarily opening a recirculation valve provided to a recirculation passage connecting a downstream side and an upstream side of the compressor in the intake passage to return intake air between the compressor and the throttle valve to the upstream side of the compressor.

3. The method for controlling the internal combustion engine according to claim 1, further comprising temporarily controlling a variable valve mechanism to a control position at which volumetric efficiency deteriorates, the variable valve mechanism which is capable of changing at least one of an opening and closing timing and a lift amount of an intake valve.

4. The method for controlling the internal combustion engine according to claim 1, wherein when the lean combustion mode is shifted to the stoichiometric combustion mode, ignition timing retard is carried out.

5. An internal combustion engine configured to be switchable between a stoichiometric combustion mode having a theoretical air-fuel ratio as a target air-fuel ratio and a lean combustion mode having a lean air-fuel ratio as a target air-fuel ratio on a premise of supercharging, the internal combustion engine comprising:

a turbocharger;

a throttle valve on a downstream side of a compressor of the turbocharger in an intake passage;

an air bypass passage extending from a position more on a downstream side than the throttle valve to an upstream side of the compressor in the intake passage;

an air bypass valve configured to open and close the air bypass passage; and a controller, wherein the controller is configured to reduce an opening degree of the throttle valve immediately in response to the lean combustion mode shifting to the stoichiometric combustion mode, and temporarily open the air bypass valve to bypass intake air inside a collector to the upstream side of the compressor immediately in response to the lean combustion mode shifting to the stoichiometric combustion mode.

* * * * *